(12) United States Patent
Burdick et al.

(10) Patent No.: US 11,150,881 B2
(45) Date of Patent: Oct. 19, 2021

(54) ADVANCED LAYER EDITOR

(71) Applicant: ROKU, INC., Los Gatos, CA (US)

(72) Inventors: Robert Burdick, Los Gatos, CA (US);
Roman Parashchyn, Lviv Oblast (UA);
Yurii Shkrobut, Lviv Oblast (UA);
Olena Mykula, Lviv Oblast (UA);
Yurii Polishchuk, Lviv Oblast (UA)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 16/220,080

(22) Filed: Dec. 14, 2018

(65) Prior Publication Data
US 2020/0192644 A1  Jun. 18, 2020

(51) Int. Cl.
| | |
|---|---|
| H04N 21/431 | (2011.01) |
| G06F 8/38 | (2018.01) |
| G06F 9/451 | (2018.01) |
| H04N 21/472 | (2011.01) |
| H04N 21/443 | (2011.01) |
| G06F 3/0482 | (2013.01) |
| H04N 21/482 | (2011.01) |

(52) U.S. Cl.
CPC .............. G06F 8/38 (2013.01); G06F 3/0482 (2013.01); G06F 9/451 (2018.02); H04N 21/4438 (2013.01); H04N 21/472 (2013.01); H04N 21/4312 (2013.01); H04N 21/482 (2013.01)

(58) Field of Classification Search
CPC .......... G06F 8/38; G06F 9/451; G06F 3/0482; G06F 3/1251; H04N 21/472; H04N 21/4312; H04N 21/482
See application file for complete search history.

(56) References Cited

U.S. PATENT DOCUMENTS

| | | | |
|---|---|---|---|
| 8,850,490 B1* | 9/2014 | Thomas | H04N 21/2543 725/61 |
| 9,723,044 B1* | 8/2017 | Kosslyn | G06F 12/06 |
| 9,961,402 B1* | 5/2018 | Balasubramanian | G06Q 30/02 |

(Continued)

OTHER PUBLICATIONS

International Search Report and Written Opinion of the International Searching Authority directed to related International Patent Application No. PCT/US2019/065637, dated Apr. 9, 2020; 7 pages.

*Primary Examiner* — Shen Shiau
(74) *Attorney, Agent, or Firm* — Sterne, Kessler, Goldstein & Fox P.L.L.C.

(57) ABSTRACT

Disclosed herein are system, method, and computer program product embodiments for designing a channel's interface. An embodiment operates by a client device—(i) receiving an input for designing the channel's interface; (ii) determining an input event based on the input; (iii) creating a command based on the input event; and (iv) routing the command to a host device so that the host device determines a feature of the channel therefrom. Another embodiment operates by a host device—(i) receiving a command for a design for the channel's interface from a client device, the command may comprise a unique identifier and based on user input provided on the client device; (ii) identifying the command based on the command's unique identifier; (iii) determining a response based on the command; (iv) determining a feature of the channel based on the response; and (v) incorporating the feature into the interface of the channel.

44 Claims, 7 Drawing Sheets

(56) References Cited

U.S. PATENT DOCUMENTS

| | | | |
|---|---|---|---|
| 2005/0069225 A1* | 3/2005 | Schneider | H04N 21/234318 382/305 |
| 2010/0223565 A1 | 9/2010 | Birdal et al. | |
| 2010/0269152 A1* | 10/2010 | Pahlavan | H04L 63/0884 726/3 |
| 2012/0144416 A1* | 6/2012 | Wetzer | H04N 21/812 725/14 |
| 2012/0210208 A1 | 8/2012 | Underhill et al. | |
| 2014/0096014 A1 | 4/2014 | Johnson et al. | |
| 2014/0173644 A1* | 6/2014 | Ball | H04N 21/4826 725/14 |
| 2014/0173648 A1* | 6/2014 | Ball | H04N 21/8133 725/25 |
| 2014/0366047 A1* | 12/2014 | Thomas | H04N 21/2665 725/5 |
| 2015/0020119 A1* | 1/2015 | Kim | H04N 21/4312 725/59 |
| 2015/0067664 A1 | 3/2015 | Ligman et al. | |
| 2015/0358663 A1* | 12/2015 | Malone | H04N 21/25891 725/45 |
| 2018/0292958 A1 | 10/2018 | Martinez et al. | |
| 2019/0238489 A1* | 8/2019 | Cohen | H04L 51/14 |
| 2019/0238944 A1* | 8/2019 | Balasubramanian | H04N 21/2668 |

* cited by examiner

ADVANCED LAYER EDITOR

BACKGROUND

Channels providing audio and/or visual content may be distributed to the public over various networks. However, in order to do so, the layout of the channel may have to be designed, developed, and thoroughly tested by an entity managing the network. Only thereafter may the channel be published and distributed to the public over the network. Accordingly, developers and/or designers typically create and/or design the layout of the channel without knowing if their layout will conform to the standards/requirements of the entity managing the network. As such, developers and/or designers may submit their layout to the entity for approval and wait a predetermined amount of time for a response (e.g., days or weeks). At times, developers and/or designers will have to submit revised layouts to comply with the entity's standards/requirements. This leads to a very inefficient process for developers and/or designers to create and design layouts for channels to be distributed on an entity's network.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for creating and/or designing an interface of a channel. For example, a content providing entity may request distribution of content over a particular channel of a network owned and/or operated by a content controlling entity. As such, the content providing entity and/or content controlling entity may be private or public and may be a person or organization. The content may be audio and/or visual. The channel may refer to a band of frequencies, or a virtual number, for the transmission of the content. The network can include, without limitation, wired and/or wireless intranet, extranet, Internet, cellular, Bluetooth and/or any other short range, long range, local, regional, global communications network(s), as well as any combination thereof.

Accordingly, to distribute content over a particular channel, the content providing entity may be required by the content controlling entity to create and/or design an interface of the channel. In order to do so, the content controlling entity may provide a program that provides a user interface for the content providing entity to create and/or design the channel. As such, a consistent user experience design may be provided that allows the dynamic creation of an interface for a particular channel. This may allow for designers and/or developers to dynamically design, layout and/or configure features of a channel's layout for prototyping and designing. In doing so, this may allow designers and/or developers to provide and define features (e.g., user-interface components) and to define their relationship with other features on the channel. Moreover, the design of the channel may be reflected in real-time and be based on predefined commands provided by the third party, as will be discussed in more detail below. This may allow the channel to be publically available to users (e.g., those to view) on a third party's platform without review, approval, and restriction of the third party.

Figure 1:
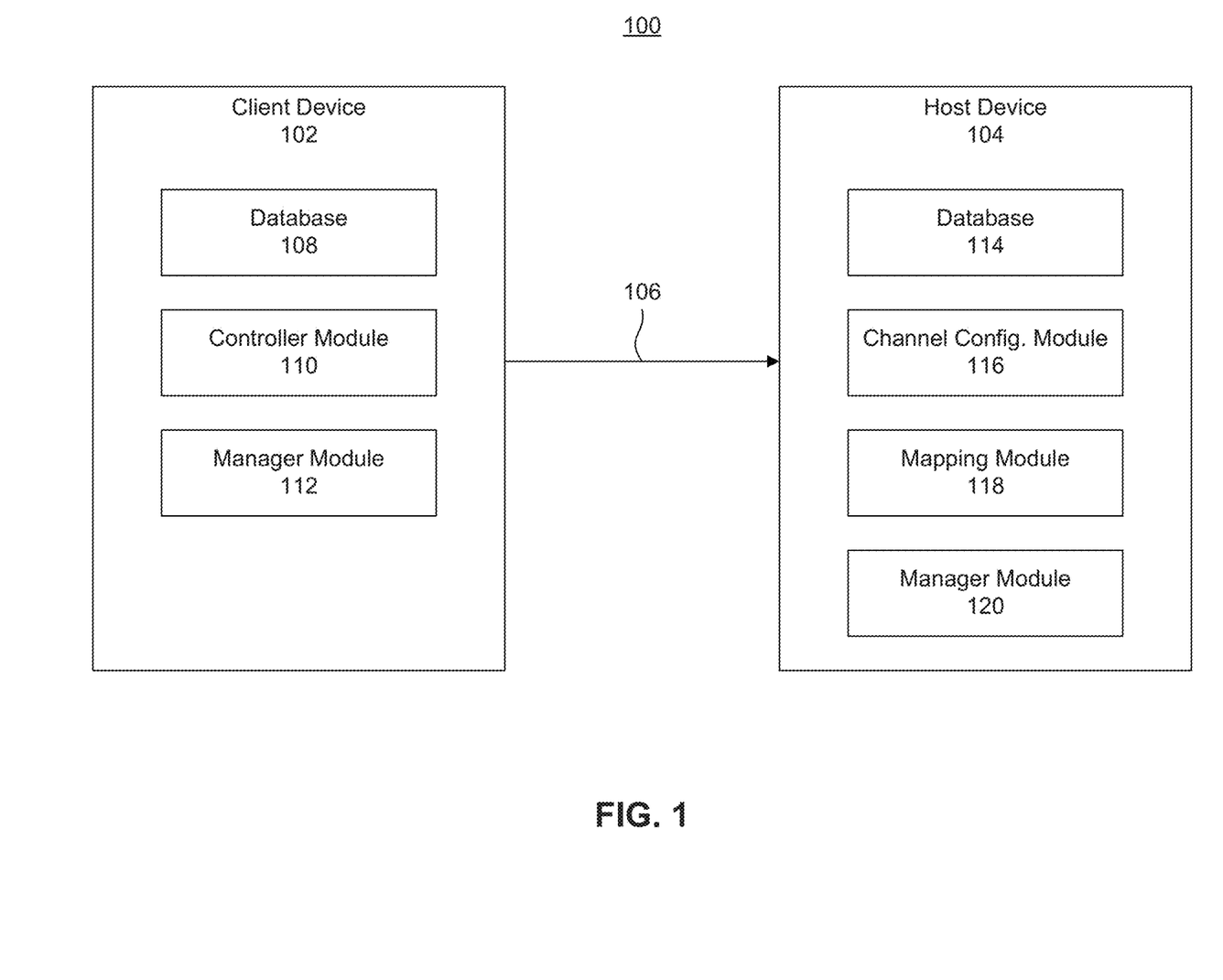
FIG. 1 is a block diagram of a system for designing an interface of a channel, according to some embodiments.

FIG. 1 illustrates a block diagram of a system 100 for designing of an interface of a channel. The system 100 may comprise a user device 102 and a host device 104. The host device 104 may be separate from the user device 102. However, the user device 102 and the host device 104 may be managed by the same entity (e.g., the content controlling entity). As such, the content controlling entity may manage the channel, the user device 102, and the host device 104. Alternatively, the content controlling entity may only manage the channel and not the host device 104 and/or user device 102. Along these lines, the user device 102 and the host device 104 may communicate over a line of communication 106. The line of communication 106 may be public or private and may be connected via an address (e.g., IP address), and the data transmitted over the line of communication 106 may be encrypted.

The user device 102 may comprise a database 108, a controller module 110, and a manager module 112. The database 108 may store an application for permitting the creation and/or design of an interface of a channel. As such, the application may be pre-loaded onto the database 108. Alternatively, the application may be downloaded onto the database 108. The application may provide a protocol for communication between the user and host devices 102, 104 for creating and/or designing the interface of the channel. The protocol may be provided and/or managed by the content controlling entity. Accordingly, the protocol may permit the user device 102 to issue one or more of the commands provided in Table 1 to the host device 104.

TABLE 1

| Command | Description | Request Arguments | Request Example | Response Example |
|---|---|---|---|---|
| init | Sets current node to root. Creates m.selectorView. Returns version. | no arguments | {<br>"uuid":<br>"68c7318d-5f8c-4e46",<br>"command":<br>"init"<br>} | raleVersion: {string} - RALE version |

TABLE 1-continued

| Command | Description | Request Arguments | Request Example | Response Example |
|---|---|---|---|---|
| showSelectorView | Shows Selector View node on the screen. | no arguments | {<br>    "uuid": "68c7318d-5f8c-4e46",<br>    "command": "showSelectorView"<br>} | no response |
| hideSelectorView | Removes Selector View node from the screen. | no arguments | {<br>    "uuid": "68c7318d-5f8c-4e46",<br>    "command": "hideSelectorView"<br>} | no response |
| selectNode | Gets node by path and sets it into the current node. | path: {array} - path to node | {<br>    "uuid": "68c7318d-5f8c-4e46",<br>    "command": "selectNode",<br>    "args": {<br>        "path": [{"child": 1}]<br>    }<br>} | path: {array} - path to node<br>node: {object} - node data:<br>item: {object} - contains index, type, value etc.<br>fieldlist: {object} - node fields<br>layout: {object} - contains node layout data<br>childlist: {array} - node children |
| updateNode | Updates the current node. | no arguments | {<br>    "uuid": "68c7318d-5f8c-4e46",<br>    "command": "updateNode"<br>} | path: {array} - path to node<br>node: {object} - node data:<br>item: {object} - contains index, type, value etc.<br>fieldlist: {object} - node fields<br>layout: {object} - contains node layout data (only for 'SGNode')<br>childlist: {array} - node children (only for 'SGNode') |
| getNodeData | Returns the current node data. | no arguments | {<br>    "uuid": "68c7318d-5f8c-4e46",<br>    "command": "getNodeData"<br>} | item: {object} - contains index, type, value etc.<br>fieldlist: {object} - node fields<br>layout: {object} - contains node layout data (only for 'SGNode')<br>childlist: {array} - node children (only for 'SGNode') |
| getItemList | Returns node data and children, by node path. If the node isn't 'SGNode' returns error | path: {array} - path to node | {<br>    "uuid": "68c7318d-5f8c-4e46",<br>    "command": "getItemList",<br>    "args": {<br>        "path": [{"child": 1}]<br>    }<br>} | item: {object} - contains index, type, value etc.<br>childlist: {array} - node children |

TABLE 1-continued

| Command | Description | Request Arguments | Request Example | Response Example |
|---|---|---|---|---|
| getNodeTree | Returns children hierarchy by node path. If the node isn't 'SGNode' returns error | path: {array} - path to node | {<br>"uuid": "68c7318d-5f8c-4e46",<br>"command": "getNodeTree",<br>"args": {<br>"path": [{"child": 1}]<br>}<br>} | item: {object} - contains index, type, value etc<br>childlist: {array} - node children (each child contains item and childlist) |
| addChild | Adds new child to node by path, type and index. If no path in argument, adds child to the current node. If no index adds child to the end of child list. If no type returns error. | path: {array} - path to node<br>index: {integer} - child index<br>type: {string} - child type | {<br>"uuid": "68c7318d-5f8c-4e46",<br>"command": "addChild",<br>"args": {<br>"path": [{"child": 1}],<br>"index": 2,<br>"type": "ContentNode"<br>}<br>} | tree: {object} - children hierarchy of added child<br>childindex: {integer} - index by which child has been added |
| removeChild | Removes child from node by path. if no path removes from the current node. | path: {array} - path to node<br>index: {integer} - child index | {<br>"uuid": "68c7318d-5f8c-4e46",<br>"command": "removeChild",<br>"args": {<br>"path": [{"child": 1}],<br>"index": 2<br>}<br>} | success: {boolean} - true if child has been deleted |
| moveChild | Moves child of the current node | fromIndex: {integer} - index of child<br>toIndex: {integer} - new index of child | {<br>"uuid": "68c7318d-5f8c-4e46",<br>"command": "moveChild",<br>"args": {<br>"fromIndex": 0,<br>"toIndex": 2<br>}<br>} | success: {boolean} - true if child has been moved |
| setField | Sets new value into the current node field. If the field doesn't exist creates it. | field: {string} - id of node field<br>type: {string} - field type<br>value: {string \| number} - field velue | {<br>"uuid": "68c7318d-5f8c-4e46",<br>"command": "setField",<br>"args": {<br>"field": "color",<br>"type": "color",<br>"value": "#334455"<br>}<br>} | [field id]: {object} - contains field data ... (all fields of node) |
| removeField | Removes field from the current node by id. | field: {string} - id of node field | {<br>"uuid": "68c7318d-5f8c-4e46",<br>"command": "removeField",<br>"args": {<br>"field": "customField"<br>}<br>} | [field id]: {object} - contains field data ... (all fields of node) |

TABLE 1-continued

| Command | Description | Request Arguments | Request Example | Response Example |
|---|---|---|---|---|
| setFocus | Sets focus in node by path. | path: {array} - path to node | {<br>  "uuid": "68c7318d-5f8c-4e46",<br>  "command": "setFocus",<br>  "args": {<br>    "path": [{"child": 1}]<br>  }<br>} | success: {boolean} - true if node has been focused |
| selectFocusedNode | Gets focused node and sets it into the current node. | no arguments | {<br>  "uuid": "68c7318d-5f8c-4e46",<br>  "command": "selectFocusedNode"<br>} | path: {array} - path to node<br>node: {object} - node data:<br>item: {object} - contains index type value etc.<br>fieldlist: {object} - node fields<br>layout: {object} - contains node layout data<br>childlist: {array} - node children |
| setBoundingRect | Sets properties into the current node layout. | boundingrect: {object} - bounding rect:<br>x: {number} - coordinate<br>y: {number} - node Y coordinate<br>width: {number} - node width<br>height: {number} - node height | {<br>  "uuid": "68c7318d-5f8c-4e46",<br>  "command": "setBoundingRect",<br>  "args": {<br>    "boundingrect": {<br>      "x": 10,<br>      "y": 300,<br>      "width": 250,<br>      "height": 100<br>    }<br>  }<br>} | x: {number} - node X coordinate<br>y: {number} - node Y coordinate<br>width: {number} - node width<br>height: {number} - node height |

It is noted that the commands in Table 1 are provided for example purposes only, and this disclosure is not limited to Table 1.

In order to issue the aforementioned commands, the controller module 110 may receive an input (e.g., from a user) relating to the design and/or layout of the channel's interface. As will be described in more detail below with respect to FIG. 4, the input may relate to a user-interface component (e.g., "Button"). The user-interface component (e.g., "Button") may comprise user-definable fields (e.g., length, width, height). Moreover, the user-interface component may depend on other user-interface components, as determined by the user. Furthermore, as will be described in more detail below with respect to FIG. 4, the user-interface component may depend on other user-interface components.

Accordingly, based on the received input, the controller module 110 may determine an input event. In other words, the input event may be based on the user-interface component and user-definable fields chosen by the user, as well as a dependency of the underlying user-interface component on other user-interface components, as will be discussed in more detail below with respect to FIG. 4. Based on the input event, the controller module 110 may then determine an appropriate command to be sent to the manager module 112. The command may include a unique identifier for identification by the manager module 112. The command may also include a relationship of the user-interface component on other user-interface components for identification by the manager module 112. In doing so, the command may identify a parent user-interface component of a child user-interface component, as will be described below. As such, the command may be a function of the user-interface component and optionally its relationship with another user-interface component.

As such, the manager module 112 may be in communication with the controller module 110 and receive the appropriate command to be sent to the host device 104. The manager module 112 may then send a request to the host device 104 or a component thereof (e.g., a manager module 120). The request may be in a specific format. For example, the request may have a JSON format. As such, the request may have the following structure:

```
{       uuid: [universally unique identifier],
        command: [name of RALE command],
        args: [command arguments]         }
``` in some embodiments, the manager module 112 may manage communication for the user device 102. As such, the manager module 112 may be in communication with the host device 104 or with a component thereof (e.g., a manager module 120). Thus, the manager module 120 may manage communication for the host device 104. Accordingly, the manager modules 112, 120 may manage communication for their respective user, host devices 102, 104.

As stated above, the host device 104 may be managed by a content controlling entity. The content controlling entity may provide access to a plurality of channels via the host device 104. As such, the host device 104 may permit loading of a channel thereto. This may be done via the user device 102. Alternatively, the channel may be preloaded onto the host device 104. Thus, the host device 104 may only permit the design and/or creation of a channel's interface only after the channel is loaded thereon. As such, the channel may comprise and/or integrate components of the host device 104 that permit designing an interface of the channel (e.g., channel configuration module 116, mapping module 118, manager module 120).

Accordingly, the host device 104 may comprise a database 114, a channel configuration module 116, a mapping module 118, and a manager module 120. Although not illustrated, the mapping module 118 and the channel configuration module 116 may be integrated into a single module. The database 114 may store channels and their layouts. The database 114 may also store the protocol for designing the channel as discussed above. The channel configuration module 116 may be in communication with the database 114 and/or the mapping module 118. The channel configuration module 116 may determine an intended design of the channel based on the instructions received by the mapping module 118. As such, the mapping module 118 may be in communication with the manager module 120 to determine an appropriate instruction for the channel configuration module 116 based on the receipt of the request received by the manager module 120.

Thus, the manager module 120 of the host device 104 may receive a request from user device 102 or its manager module 112. The manager module 120 may then forward the request to the mapping module 118. The mapping module 118 may be in communication with the database 114 to determine an appropriate response based on the request. In doing so, the mapping module 118 may map the request to the corresponding response based on the protocol stored in the database 114. The response may be in the following format—[start][uuid={length of request uuid}]{request uuid}{JSON of response}[end]. The mapping module 118 may then forward the instructions to the channel configuration module 116. The channel configuration module 116 can thereafter determine an intended design of the channel based on the instructions.

Figure 2:
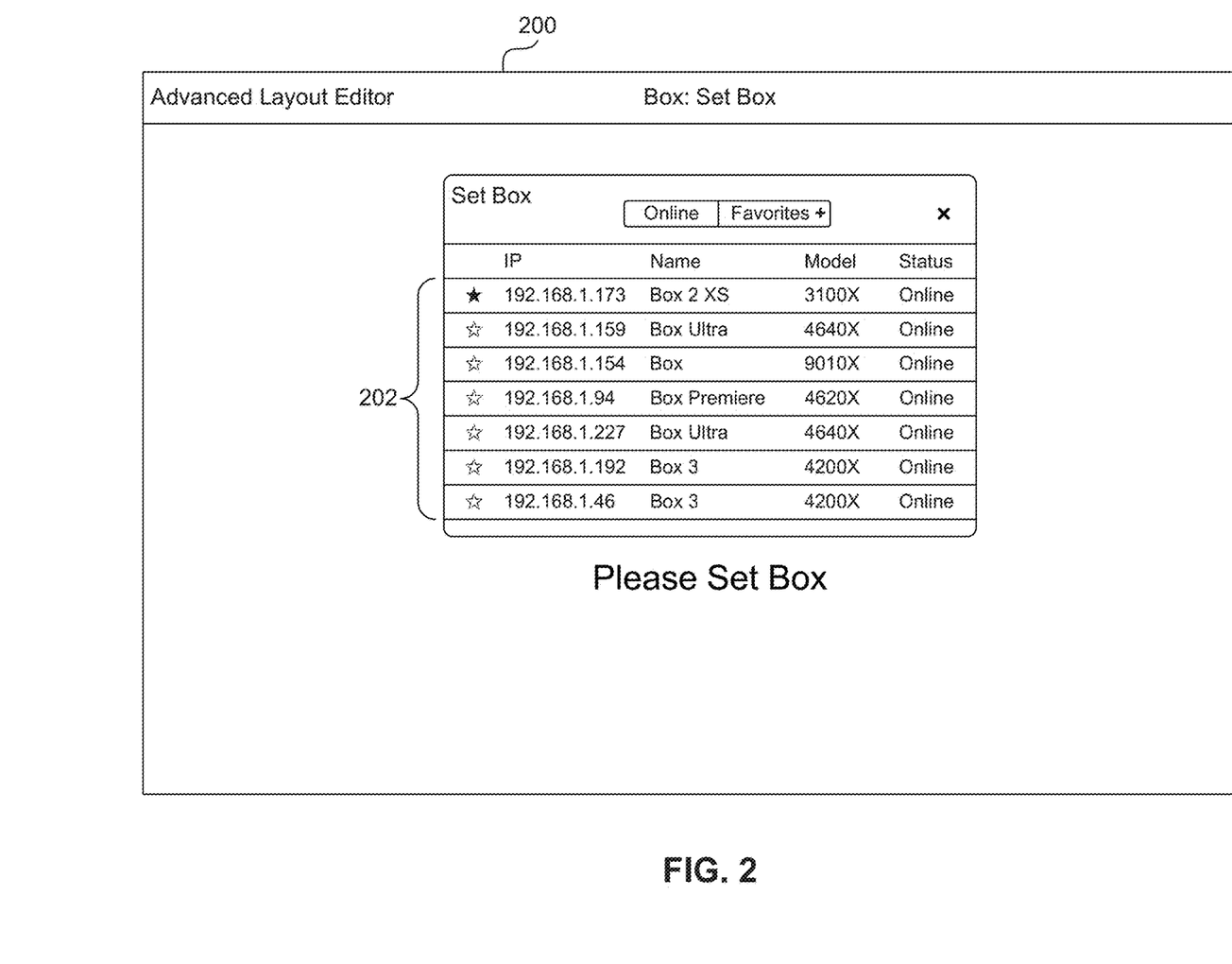
FIGS. 2-4 are exemplary user interfaces for designing an interface of a channel, according to some embodiments.
Figure 3:
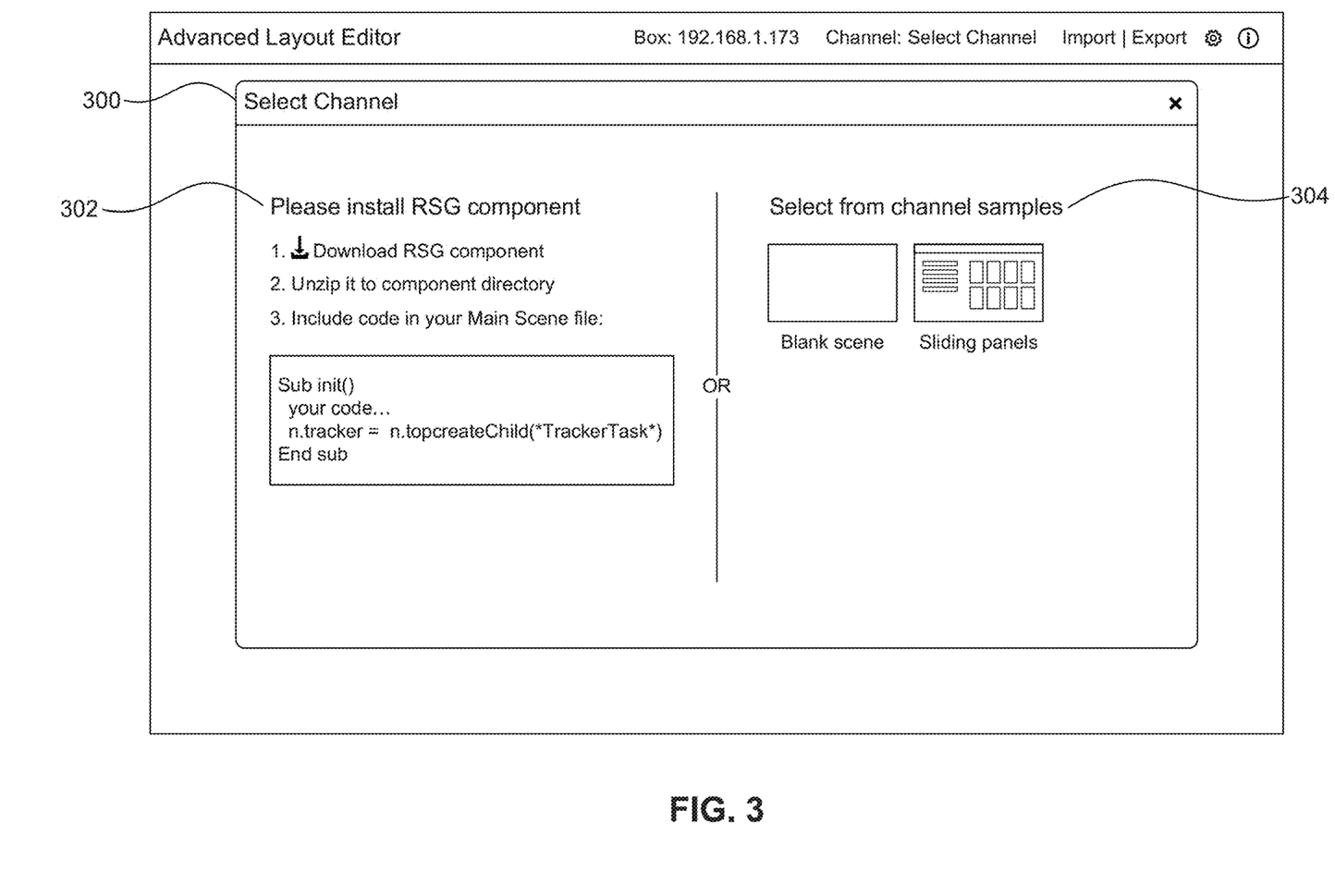
Figure 4:
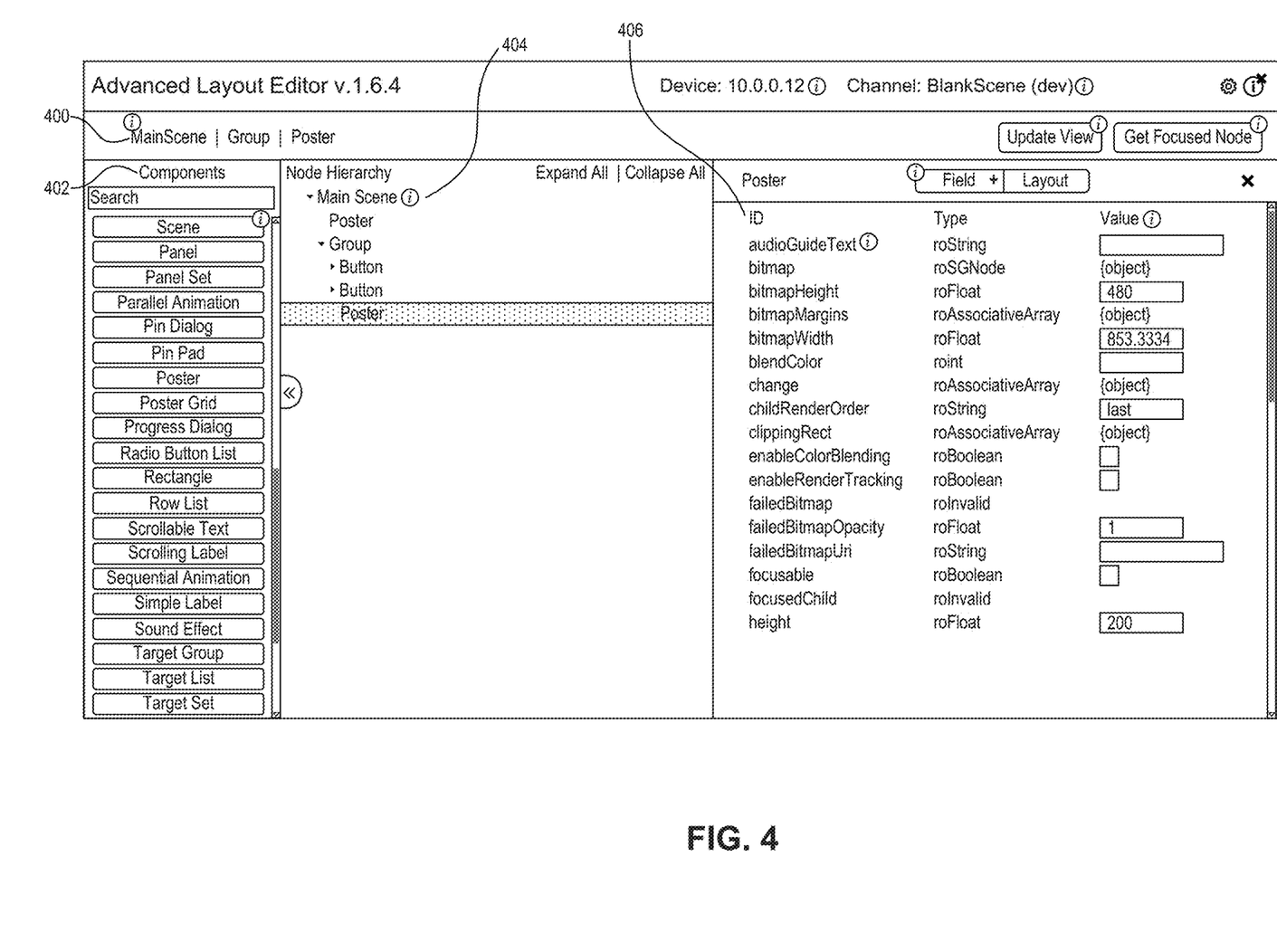

FIGS. 2-4 illustrate interfaces that may be provided via the user device 102 (illustrated in FIG. 1). FIG. 2 illustrates a user interface 200 for connecting an appropriate user device 102 to the host device 104 (each shown on FIG. 1). As illustrated, the user interface 200 may provide user devices 202 that are currently online. Although not illustrated, the user interface 200 may also provide user devices that are "favorites" to the user, which may include those which were previously designated as such by the user. For each user device 202, the user interface 200 may display an IP address, a name, a model type, and/or a status (e.g., Online or Offline). Moreover, the user interface 200 may also permit adding of a user device. To do so, the user interface 200 may allow input of an IP address of the user device, a name of the user device, and/or a model type of the user device.

FIG. 3 illustrates a user interface 300 for loading and/or accessing a channel onto the host device 104 (shown on FIG. 1). In doing so, the user interface 300 may provide channel templates to assist in the design of the channel. The user interface 300 may also provide a blank template for freestyle design or a template having sliding panels for a pre-defined design. These templates may provide predetermined user-interface components, as will be described in more detail below. The predetermined user-interface components may be provided by the same entity managing the application permitting the design of the interface of the channel (e.g., the content controlling entity).

The user interface 300 may also permit uploading of custom user-interface components to be accessible in the design of the channel and/or of code to be included therewith. The custom user-interface components may be different than the predefined user-interface components. Along these lines, the custom user-interface components may be provided by an entity different from that managing the application permitting the design of the interface of the channel. For example, although the content controlling entity manages the design of the interface of the channel, a different entity may provide the custom user-interface components. As such, since the content controlling entity may manage the protocol for designing the channel's interface, the custom user-interface components that are provided by a different entity may be required to conform to commands of the application's protocol. Thus, the application's protocol—stored in the database 108 of the user device 102 (each illustrated in FIG. 1) may only support select custom user-interface components.

FIG. 4 illustrates a user interface 400 for designing an interface of a channel. The user interface 400 may comprise a list of user-interface components 402. The user-interface components 402 may relate to an attribute that is to be provided on the interface of the channel. The attribute may be a visual feature of the interface of the channel or any aspect related thereto. The user interface 400 may permit the creation of a hierarchy of user-interface components 404 based on the list of user-interface components 402. For example, user-interface components 402 may be dragged and dropped into the hierarchy of user-interface components 404.

Accordingly, the hierarchy of user-interface components 404 may comprise different levels of user-interface components. Each level of user-interface components in the hierarchy of user-interface components 404 may be dependent on a lower level of user-interface components. For example, a parent user-interface components may comprise child user-interface components, each of which may comprise their own child user-interface components.

Moreover, after the creation of the hierarchy of user-interface components 404, the user interface 400 may permit selection of a particular component in the hierarchy of user-interface components 404. Thereafter, the user interface 400 may present fields 406 relating to the particular component. The fields 406 may determine any aspect of a feature of the channel. As such, the fields may be user-definable fields and/or predefined fields. The user-definable fields 406 may permit receipt of text and/or values from a user. The predefined fields may be based on the relationship of its user-interface component to another user-interface component in the hierarchy of user-interface components 404.

As stated above, each user-interface component 404 may relate to a feature of the channel. The feature can relate to an appearance of an object, a position of an object, and/or media content. Examples of the appearance of an object include color, text, size, iconography, and animations.

Examples of media content include specifying media content to be played back and providing related user-interface elements to be presented.

Moreover, as user-interface components may have a child/parent relationship, their corresponding features may also have a child/parent relationship. Accordingly, the relationships of the features may be defined by the hierarchy of user-interface components 404. Along these lines, the relationships of the features is based on the relationships of the user-interface components. Thus, by modifying the relationship between user-interface components in the hierarchy of user-interface components 404 and/or entering values/text into predefined fields for user-interface components in the hierarchy of user-interface components 404, the feature of the channel may be modified. To view the modification, upon selection of a layout button 408, the user interface 400 may also permit viewing of the layout of the channel with the particular component. This may permit quickly viewing, and/or permit manipulation of, the particular component in the layout of the channel.

Accordingly, in the hierarchy of user-interface components 404, the design and/or customization of a parent user-interface component may control child user-interface components. In other words, the design and/or customization of child user-interface components may depend on the design and/or customization of its corresponding parent user-interface component. This may be accomplished via the fields 406 of the parent user-interface component or via modification/manipulation of the corresponding feature when viewing the layout of the channel's interface upon selection of the layout button 408. As such, by entering text/values in the fields 406 for the parent user-interface component or modification/manipulation of the corresponding feature, the text/values for the corresponding fields and the corresponding feature for the child user-interface components may be predetermined. For example, if a specific text/value was provided in a particular field for a parent user-interface component, the corresponding fields of the child user-interface components may automatically mirror the specific text/value. Also, if a feature of a parent user-interface was manipulated (e.g., moved), the child user-interface components may be automatically manipulated accordingly.

At any point in creating the layout of the interface of the channel, the interface may be reviewed by an authorized party of the content controlling entity. This may permit a collaborative approach between a content providing entity and the content controlling entity in real time. Moreover, the interface may be saved and accessed at a later time. The interface of the channel may be submitted and conform to the content controlling entity's standards/protocol. In return, the channel may be instantly accessible to the public without the content controlling entity's interference and/or review. Along these lines, before and/or after the channel is accessible to the public, the interface may be updated.

Figure 5:
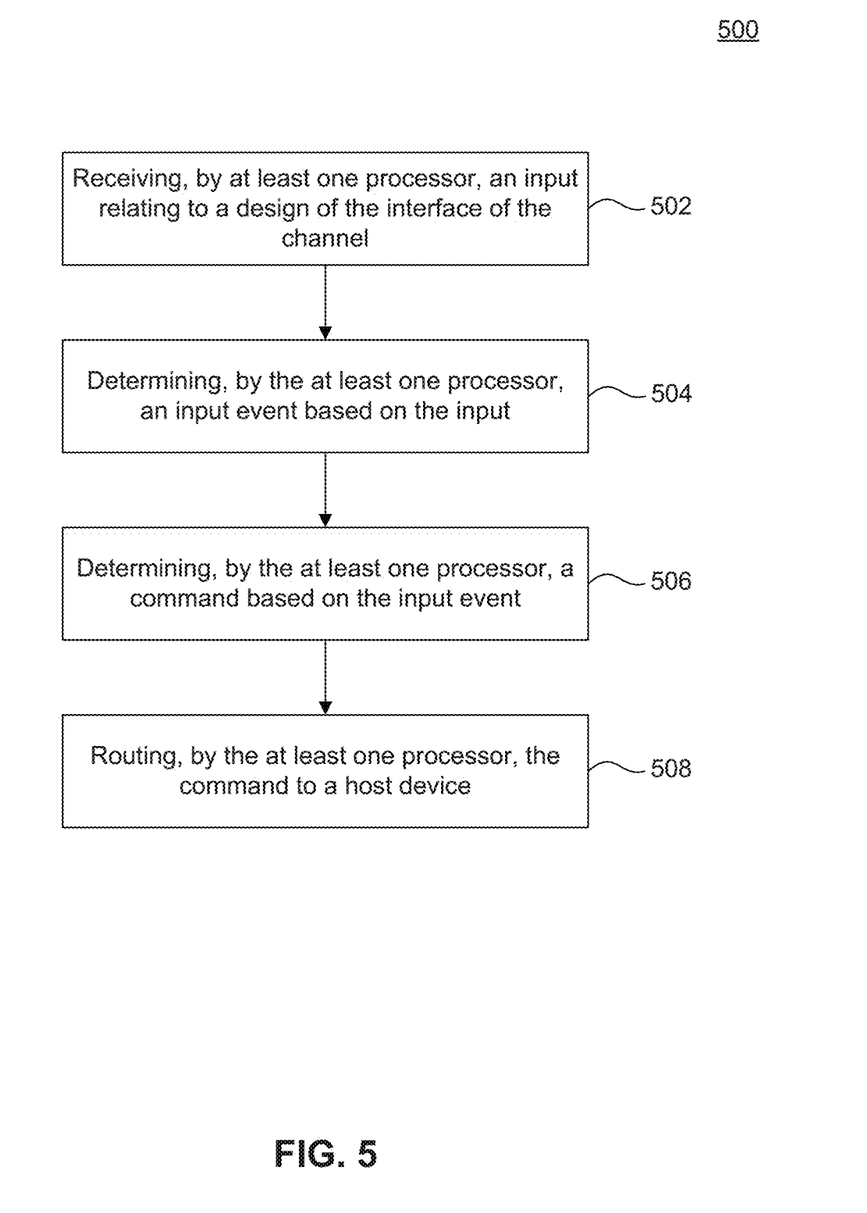
FIGS. 5 and 6 are flowcharts illustrating processes for designing an interface of a channel, according to some embodiments.
Figure 6:
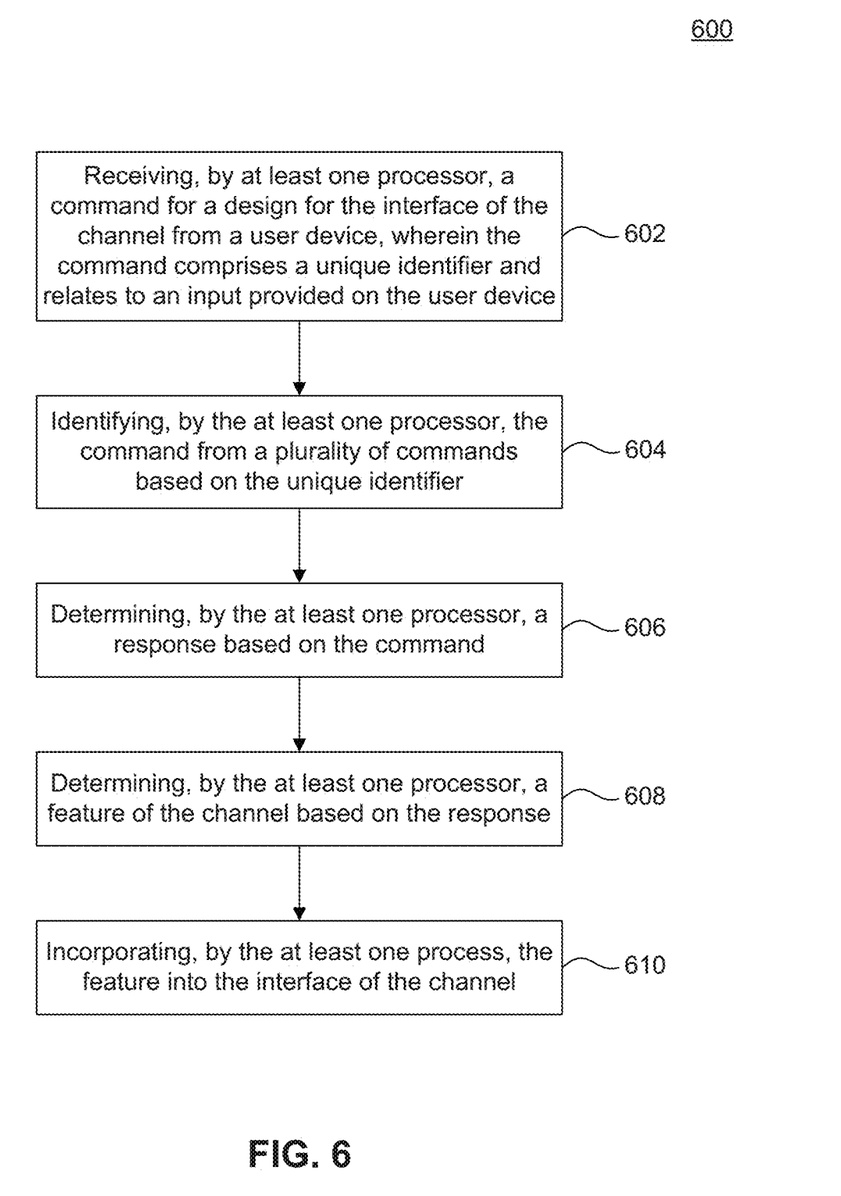

FIGS. 5 and 6 are flowcharts for methods 500, 600 for designing an interface of a channel, according to some embodiments. Methods 500, 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 5 and 6, as will be understood by a person of ordinary skill in the art.

Methods 500, 600 shall be described with reference to the description provided in FIGS. 1 and 4. However, methods 500, 600 are not limited to the exemplary embodiments of FIGS. 1 and 4.

Referring now to FIG. 5, a flowchart for method 500 for designing an interface of a channel from the perspective of the user device 102 is illustrated.

In 502, the user device 102 receives an input relating to a design of the interface of the channel. The input may relate to a particular user-interface component of the channel that is provided in a list of user-interface components 402 and inserted into a hierarchy of user-interface components 404.

Moreover, the user device 102 may sent a request to establish a connection to the host device. As such, the user device 102 may receive an acceptance to the request to establish the connection from the host device. In response, the user device 102 may establish the connection with the host device. The connection may be maintained for a predetermined amount of time (e.g., through creation and/or design of the channel's interface). Along these lines, the receiving of the input relating to the design of the channel's interface may be performed only after the sending of the request to establish the connection to the host device, the receiving of the acceptance to the request to establish the connection from the host device, and/or the establishing of the connection with the host device.

In 504, the user device 102 determines an input event based on the user input. As such, the input event may be based on the particular user-interface component. The particular user-interface component may depend on other user-interface components as defined in the hierarchy of user-interface components 404 and may depend on user-definable fields relating to the particular user-interface component. As such, the input invent may be based on a relationship between the user-interface components as defined in the hierarchy of user-interface components 404.

In 506, the user device 102 creates a command based on the input event. The command may be based on a protocol stored in a database 108 of the user device 102. The protocol may comprise a predetermined number of commands. The protocol may also be in a specified format (e.g., JSON format).

In 508, the user device 102 routes the command to a host device 104 different from the user device. The host device 104 may be configured to receive the command and to determine a feature of the channel based on the command (e.g., a visual feature).

Referring now to FIG. 6, a flowchart for method 600 for designing an interface of a channel from the perspective of the host device 104 is illustrated.

In 602, the host device 104 receives a command having a unique identifier for a design for the interface of the channel. The command may be received from a user device different from the host device 104 and may be encrypted. As such, the host device 104 may decipher the command's encryption.

Moreover, the command may relate to an input event. The input event may be based on a particular user-interface component. The particular user-interface component may depend on other user-interface components as defined in the hierarchy of user-interface components 404 and may depend on user-definable fields relating to the particular user-interface component. As such, the input invent may be based on a relationship between the user-interface components as defined in the hierarchy of user-interface components 404.

Furthermore, the host device 104 may receive a request to establish a connection from the user device 102. Thereafter, the host device 104 may determine whether to accept the request to establish the connection with the user device 102. Based on the determination, the host device 104 may establish the connection with the user device 102. Along these lines, the receiving of the command from the user device 102 may be based on the establishing of the connection with the user device 102.

In 604, the host device 104 identifies the command from a plurality of commands based on the unique identifier of the command. Each of the commands may relate to different input events.

In 606, the host device 104 determines a response based on the command. To do so, the host device 104 may include a mapping module 118, which may determine the appropriate response from a predetermined list of commands based on the unique identifier of the command. The response may include instructions for providing a feature to the layout of the channel.

In 608, the host device 104 determines the feature of the channel (e.g., visual object) based on the response. Thereafter, the host device 104 may provide a preview of the interface of the channel such that the preview includes the feature. During the preview, the host device 105 may permit manipulation of the feature.

In 610, the host device 104 incorporates a feature into the interface of the channel. After doing so, the host device 104 may receive a request for the channel incorporating the feature to be published from the client device so that the public may access the interface. Thereafter, the host device 104 may permit the visual incorporating the feature to be accessed by the public.

Figure 7:
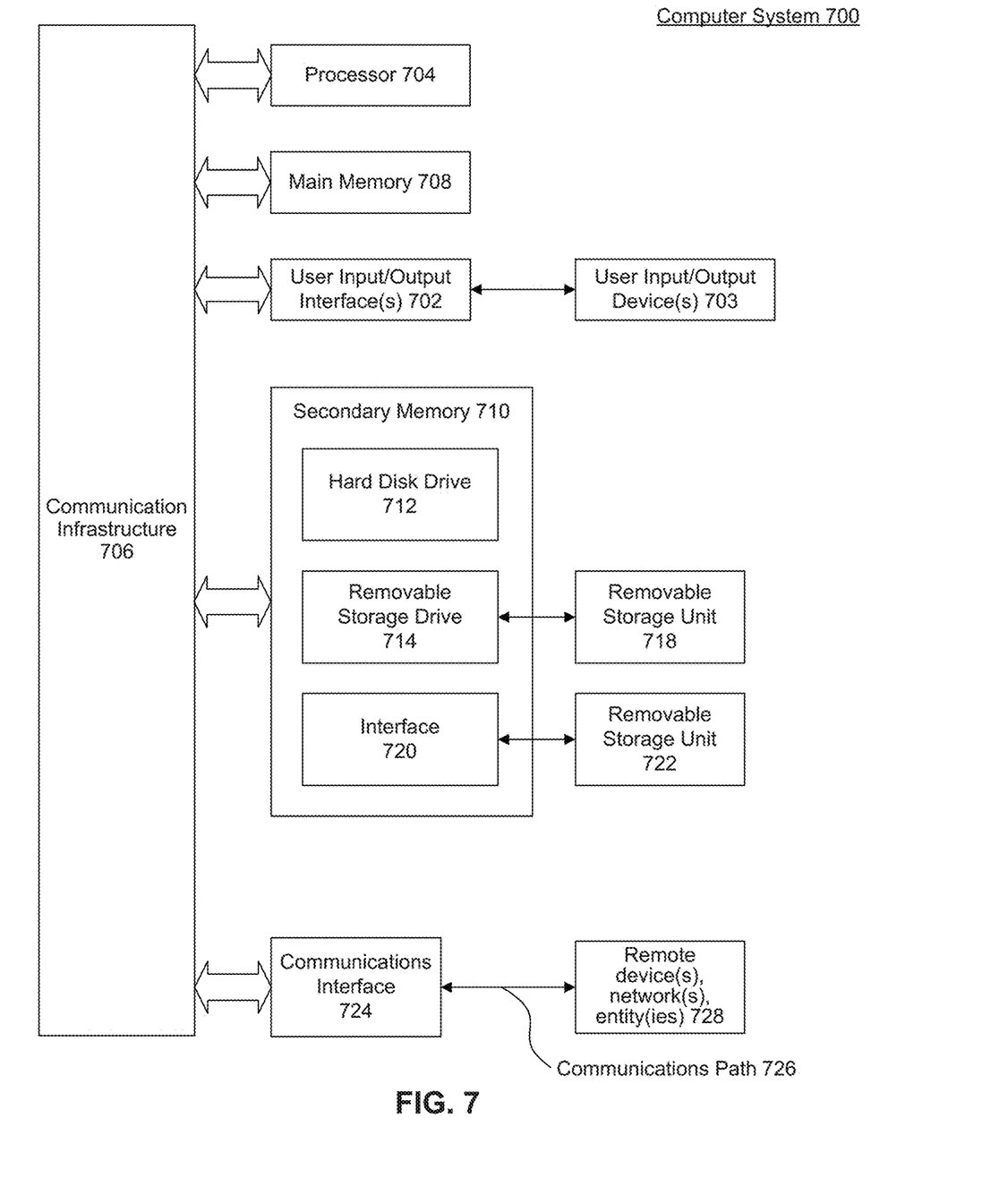
FIG. 7 is an example computer system useful for implementing various embodiments.

Various embodiments may be implemented, for example, using one or more well-known computer systems, such as computer system 700 shown in FIG. 7, One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure/bus 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to the removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for designing an interface of a channel, comprising:
   selecting, by at least one processor of a user device, the channel to be loaded onto a host device;
   receiving, by the at least one processor, permission to design or create the interface of the channel to be published to after the channel is loaded onto the host device;
   receiving, by the at least one processor, a user input relating to the design of the interface of the channel, wherein the user input relates to a first user-interface component and the first user-interface component is related to a second user-interface component as defined on a user interface of the user device;
   determining, by the at least one processor, an input event based on the user input;
   determining, by the at least one processor, a command based on the input event; and
   routing, by the at least one processor, the command to the host device, wherein the command relates to incorporation of a feature of the channel related to the first user-interface component into the interface of the channel and wherein the host device is configured to determine the feature based on the command, wherein the command includes a parent-child relationship between the first user-interface component and the second user-interface component, and wherein the user device is different from the host device.

2. The method of claim 1, further comprising:
   sending, by the at least one processor, a request to establish a connection to the host device;
   receiving, by at the at least one processor, an acceptance to the request to establish the connection from the host device;
   establishing, by the at least one processor, the connection with the host device based on the acceptance of the request to establish the connection by the host device, wherein the receiving of the input is based on the establishing of the connection with the host device.

3. The method of claim 1, wherein the first user-interface component depends on the second user-interface component.

4. The method of claim 3, wherein the input event is based on the parent-child relationship between the first user-interface component and the second user-interface component.

5. The method of claim 1, wherein the command is created in a first format.

6. The method of claim 5, wherein the first format is a JSON format.

7. The method of claim 1, wherein the command is encrypted.

8. The method of claim 1, wherein the feature relates to a visual object of the interface of the channel.

9. The method of claim 1, wherein the command is a function of the first user-interface component.

10. A computer-implemented method for designing an interface of a channel, comprising:
    loading, by at least one processor of a host device, the channel in response to receiving a user selection of the channel from a user device;

permitting, by the at least one processor, to design or create the interface of the channel to be published after the channel is loaded onto the host device;

receiving, by the at least one processor, a command for the design for the interface of the channel from the user device, wherein the command comprises a unique identifier and relates to a user input provided on the user device, wherein the user input relates to a first user-interface component and the first user-interface component is related to a second user-interface component as defined on a user interface of the user device;

identifying, by the at least one processor, the command from a plurality of commands based on the unique identifier;

determining, by the at least one processor, a response based on the command;

determining, by the at least one processor, a feature of the channel based on the response, wherein the feature relates to the first user-interface component and the command includes a parent-child relationship between the first user-interface component and the second user-interface component; and incorporating, by the at least one processor, the feature into the interface of the channel based on the response, wherein a the host device is different from the user device.

11. The method of claim 10, further comprising:

receiving, by the at least one processor, a request to establish a connection from the user device;

determining, by the at least one processor, whether to accept the request to establish the connection with the user device; and establishing, by the at least one processor, the connection with the user device based on the determining of whether to accept the request to establish the connection, wherein the receiving of the command from the user device is based on the establishing of the connection with the user device.

12. The method of claim 10, wherein the first user-interface component depends on the second user-interface component.

13. The method of claim 10, wherein the determining of the response comprises:

mapping the unique identifier of the command from the plurality of commands to the response associated with the unique identifier.

14. The method of claim 10, wherein the feature relates to a visual object to be presented on the channel.

15. The method of claim 14, further comprising:

previewing, by the at least one processor, of the interface of the channel, wherein a preview of the interface of the channel includes the visual object.

16. The method of claim 15, further comprising:

permitting, by the at least one processor, a modification of the visual object.

17. The method of claim 16, further comprising: receiving, by the at least one processor, a request for the channel incorporating the feature to be published from the user device so that a general public may access the interface; and permitting, by the at least one processor, the interface of the channel incorporating the feature to be accessed by the general public.

18. The method of claim 10, wherein the host device and the user device are managed by a same entity.

19. A non-transitory computer-readable medium having instructions stored thereon, execution of which, by one or more processors of a device, cause the one or more processors to perform operations comprising:

selecting a channel to be loaded onto a host device;

receiving permission to design or create an interface of the channel to be published after the channel is loaded onto the host device;

receiving a user input relating to the design of the interface of the channel, wherein the user input relates to a first user-interface component and the first user-interface component is related to a second user-interface component as defined on a user interface of the user device;

determining an input event based on the user input;

determining a command based on the input event; and routing the command to the host device, wherein the command relates to incorporation of a feature of the channel related to the first user-interface component into the interface of the channel and wherein the host device is configured to determine the feature based on the command, wherein the command includes a parent-child relationship between the first user-interface component and the second user-interface component, and wherein the user device is different from the host device.

20. The non-transitory computer-readable medium of claim 19, the operations further comprising:

sending a request to establish a connection to the host device;

receiving an acceptance to the request to establish the connection from the host device;

establishing the connection with the host device based on the acceptance of the request to establish the connection by the host device, wherein the receiving of the input is based on the establishing of the connection with the host device.

21. The non-transitory computer-readable medium of claim 19, wherein the command is encrypted and the command is created in a JSON format.

22. The non-transitory computer-readable medium of claim 16, wherein the feature relates to a visual object of the interface of the channel.

23. A non-transitory computer-readable medium having instructions stored thereon, execution of which, by one or more processors of a host device, cause the one or more processors to perform operations comprising:

loading a channel in response to receiving a user selection of the channel from a user device; permitting the user device to design or create an interface of the channel to be published after the channel is loaded onto the host device;

receiving a command for the design for the interface of the channel from the user device, wherein the command comprises a unique identifier and relates to a user input provided on the user device, wherein the user input relates to a first user-interface component and the first user-interface component is related to a second user-interface component as defined on a user interface of the user device;

identifying the command from a plurality of commands based on the unique identifier;

determining a response based on the command;

determining a feature of the channel based on the response, wherein the feature relates to the first user-interface component and the command includes a parent-child relationship between the first user-interface component and the second user-interface component; and incorporating the feature into the interface of the channel based on the response, wherein the host device is different from the user device.

24. The non-transitory computer-readable medium of claim 23, wherein the determining of the response comprises:
mapping the unique identifier of the command from the plurality of commands to the response associated with the unique identifier.

25. The non-transitory computer-readable medium of claim 23, the operations further comprising previewing the interface of the channel, wherein a preview of the interface of the channel includes a visual object.

26. The non-transitory computer-readable medium of claim 23, the operations further comprising:
receiving a request for the channel incorporating the feature to be published from the user device so that a general public may access the interface; and
permitting the interface of the channel incorporating the feature to be accessed by the general public.

27. A system for designing an interface of a channel, comprising:
a memory of a user device; and
a processor of the user device coupled to the memory, the processor being configured to:
select the channel to be loaded onto a host device;
receive permission to design or create the interface of the channel to be published after the channel is loaded onto the host device;
receive a user input relating to the design of the interface of the channel, wherein the user input relates to a first user-interface component and the first user-interface component is related to a second user-interface component as defined on a user interface of the user device;
determine an input event based on the user input;
determine a command based on the input event; and
route the command to the host device, wherein the command relates to incorporation of a feature of the channel related to the first user-interface component into the interface of the channel and wherein the host device is configured to determine the feature of the channel based on the command, wherein the command includes a parent-child relationship between the first user-interface component and the second user-interface component, and wherein the user device is different from the host device.

28. The system of claim 24, wherein the processor is further configured to:
send a request to establish a connection to the host device;
receive an acceptance to the request to establish the connection from the host device;
establish the connection with the host device based on the acceptance of the request to establish the connection by the host device,
wherein the receiving of the input is based on the establishing of the connection with the host device.

29. The system of claim 24, wherein the first user-interface component depends on the second user-interface component.

30. The system of claim 29, wherein the input event is based on the parent-child relationship between the first user-interface component and the second user-interface component.

31. The system of claim 24, wherein the command is created in a first format.

32. The system of claim 31, wherein the first format is a JSON format.

33. The system of claim 24, wherein the command is encrypted.

34. The system of claim 24, wherein the feature relates to a visual object of the interface of the channel.

35. The system of claim 24, wherein the command is a function of the first user-interface component.

36. A system for designing an interface of a channel, comprising:
a memory of a host device; and
a processor of the host device coupled to the memory, the processor being configured to:
load the channel in response to receiving a user selection of the channel from a user device;
permit the user device to design or create the interface of the channel to be published after the channel is loaded onto the host device;
receive a command for the design for the interface of the channel from the user device, wherein the command comprises a unique identifier and relates to a user input provided on the user device, wherein the user input relates to a first user-interface component and the first user-interface component is related to a second user-interface component as defined on a user interface of the user device;
identify the command from a plurality of commands based on the unique identifier;
determine a response based on the command;
determine a feature of the channel based on the response, wherein the feature relates to the first user-interface component and the command includes a parent-child relationship between the first user-interface component and the second user-interface component; and
incorporate the feature into the interface of the channel based on the response,
wherein the host device is different from the user device.

37. The system of claim 36, wherein the processor is further configured to:
receive a request to establish a connection from the user device;
determine whether to accept the request to establish the connection with the user device; and
establish the connection with the user device based on the determining of whether to accept the request to establish the connection,
wherein the receiving of the command from the user device is based on the establishing of the connection with the user device.

38. The system of claim 36, wherein the first user-interface component depends on the second user-interface component.

39. The system of claim 36, wherein the determining of the response comprises: mapping the unique identifier of the command from the plurality of commands to the response associated with the unique identifier.

40. The system of claim 36, wherein the feature relates to a visual object to be presented on the channel.

41. The system of claim 40, wherein the processor is further configured to:
preview the interface of the channel, wherein the preview includes the visual object.

42. The system of claim 41, wherein the processor is further configured to: permit a modification of the visual object.

43. The system of claim 42, wherein the processor is further configured to:
receive a request for the channel incorporating the feature to be published from the user device so that a general public may access the interface; and permit the interface of the channel incorporating the feature to be accessed by the general public.

44. The system of claim 36, wherein the host device and the user device are managed by a same entity.

\* \* \* \* \*